(12) United States Patent
Wasserman et al.

(10) Patent No.: US 11,539,503 B2
(45) Date of Patent: Dec. 27, 2022

(54) CONTAINER MANAGEMENT FOR CRYPTANALYSIS ATTACK PROTECTION

(71) Applicant: RED HAT, INC., Raleigh, NC (US)

(72) Inventors: Orit Wasserman, Mitzpe Aviv (IL); Gabriel Zvi BenHanokh, Tel-Aviv (IL)

(73) Assignee: RED HAT, INC., Raleigh, NC (US)

( * ) Notice: Subject to any disclaimer, the term of this patent is extended or adjusted under 35 U.S.C. 154(b) by 113 days.

(21) Appl. No.: 17/190,556

(22) Filed: Mar. 3, 2021

(65) Prior Publication Data

US 2022/0286269 A1    Sep. 8, 2022

(51) Int. Cl.
*H04L 9/00* (2022.01)
*G06F 21/56* (2013.01)

(52) U.S. Cl.
CPC .............. *H04L 9/002* (2013.01); *G06F 21/56* (2013.01)

(58) Field of Classification Search
CPC ................................ H04L 9/002; G06F 21/56
See application file for complete search history.

(56) References Cited

U.S. PATENT DOCUMENTS

| | | | |
|---|---|---|---|
| 8,386,800 B2 | 2/2013 | Kocher et al. | |
| 9,049,013 B2* | 6/2015 | Paczkowski | .......... H04W 12/08 |
| 9,363,078 B2 | 6/2016 | Taylor et al. | |
| 9,614,669 B1 | 4/2017 | Cox et al. | |
| 9,823,915 B1* | 11/2017 | Maloney | ................ G06F 9/4411 |
| 10,326,744 B1* | 6/2019 | Nossik | ................ H04L 63/0435 |
| 10,389,519 B2 | 8/2019 | Cheng et al. | |
| 10,447,720 B1* | 10/2019 | Evans | ................ H04L 63/0428 |
| 10,554,383 B2 | 2/2020 | Yamane et al. | |
| 2013/0014275 A1* | 1/2013 | Goodes | ............... G06F 9/44521 719/331 |
| 2018/0046457 A1* | 2/2018 | Branca | .................. G06F 21/577 |
| 2018/0204018 A1* | 7/2018 | Panchbudhe | ........... G06F 21/10 |
| 2018/0260578 A1* | 9/2018 | Orloff | ................. G06F 21/6209 |
| 2019/0222419 A1* | 7/2019 | Adams | ...................... G06F 21/45 |
| 2019/0245857 A1* | 8/2019 | Pe'er | ......................... H04L 9/30 |
| 2019/0251278 A1* | 8/2019 | Kalinichenko | ....... H04L 9/0825 |

(Continued)

FOREIGN PATENT DOCUMENTS

| | | | |
|---|---|---|---|
| CN | 109039590 A | 12/2018 | |
| EP | 2720402 B1 | 4/2018 | |
| WO | WO-2021101516 A1 * | 5/2021 | ............. G06F 16/27 |

OTHER PUBLICATIONS

Li et al.; "ContainerVisor: Customized Control of Container Resources", 2019, IEEE, pp. 190-199. (Year: 2019).*

(Continued)

*Primary Examiner* — Matthew Smithers
(74) *Attorney, Agent, or Firm* — Kilpatrick Townsend & Stockton LLP

(57) ABSTRACT

Containers can be managed for cryptanalysis attack protection. For example, a computing system can receive, from a container, a description specifying a first hardware requirement for the container. The computing system can restrict access to hardware based on the first hardware requirement for the container. The computing system can perform, for a data object requested by the container, an encryption operation and a decryption operation using the hardware. A result of the encryption operation can be inaccessible to the container prior to the decryption operation.

20 Claims, 4 Drawing Sheets

(56) References Cited

U.S. PATENT DOCUMENTS

| | | | |
|---|---|---|---|
| 2019/0260716 A1* | 8/2019 | Lerner | H04L 63/0876 |
| 2020/0004451 A1* | 1/2020 | Prohofsky | G06F 3/0604 |
| 2020/0012511 A1* | 1/2020 | Ganesh | G06F 9/44526 |
| 2020/0057664 A1* | 2/2020 | Durham | G06F 12/1408 |
| 2020/0372129 A1* | 11/2020 | Gupta | G06F 9/3842 |
| 2020/0380130 A1* | 12/2020 | Purushotham | G06F 12/145 |
| 2020/0389317 A1* | 12/2020 | Dunjic | H04L 67/00 |
| 2021/0144517 A1* | 5/2021 | Guim Bernat | G06F 9/5072 |
| 2021/0247994 A1* | 8/2021 | Patil | H04L 63/0428 |
| 2022/0067156 A1* | 3/2022 | Favor | G06F 21/75 |

OTHER PUBLICATIONS

Giannakopoulos et al.; "Isolation in Docker through Layer Encryption", 2017, IEEE, pp. 2529-2532. (Year: 2017).*
Saravanan, S., et al., "Optimized Secure Scan Flip Flop to Thwart Side Channel Attack in Crypto-Chip," ICST Institute for Computer Sciences, Social Informatics and Telecommunications Engineering, 2019, https://link.springer.com/chapter/10.1007/978-3-030-15357-1_34.

* cited by examiner

CONTAINER MANAGEMENT FOR CRYPTANALYSIS ATTACK PROTECTION

TECHNICAL FIELD

The present disclosure relates generally to containers executing in a cloud environment. More specifically, but not by way of limitation, this disclosure relates to container management for cryptanalysis attack protection.

BACKGROUND

Cryptanalysis attacks in a cloud environment involve a container reading an encrypted data object that the container does not own and attempting to decrypt the data object. An encryption key is needed to decrypt the data object. If the container does not present the correct encryption key for the data object, the container does not receive access to the data object. However, the container may gain access to the data object if provided enough time and resources to continually present different encryption keys for the data object until the correct encryption key is presented.

DETAILED DESCRIPTION

Figure 1:
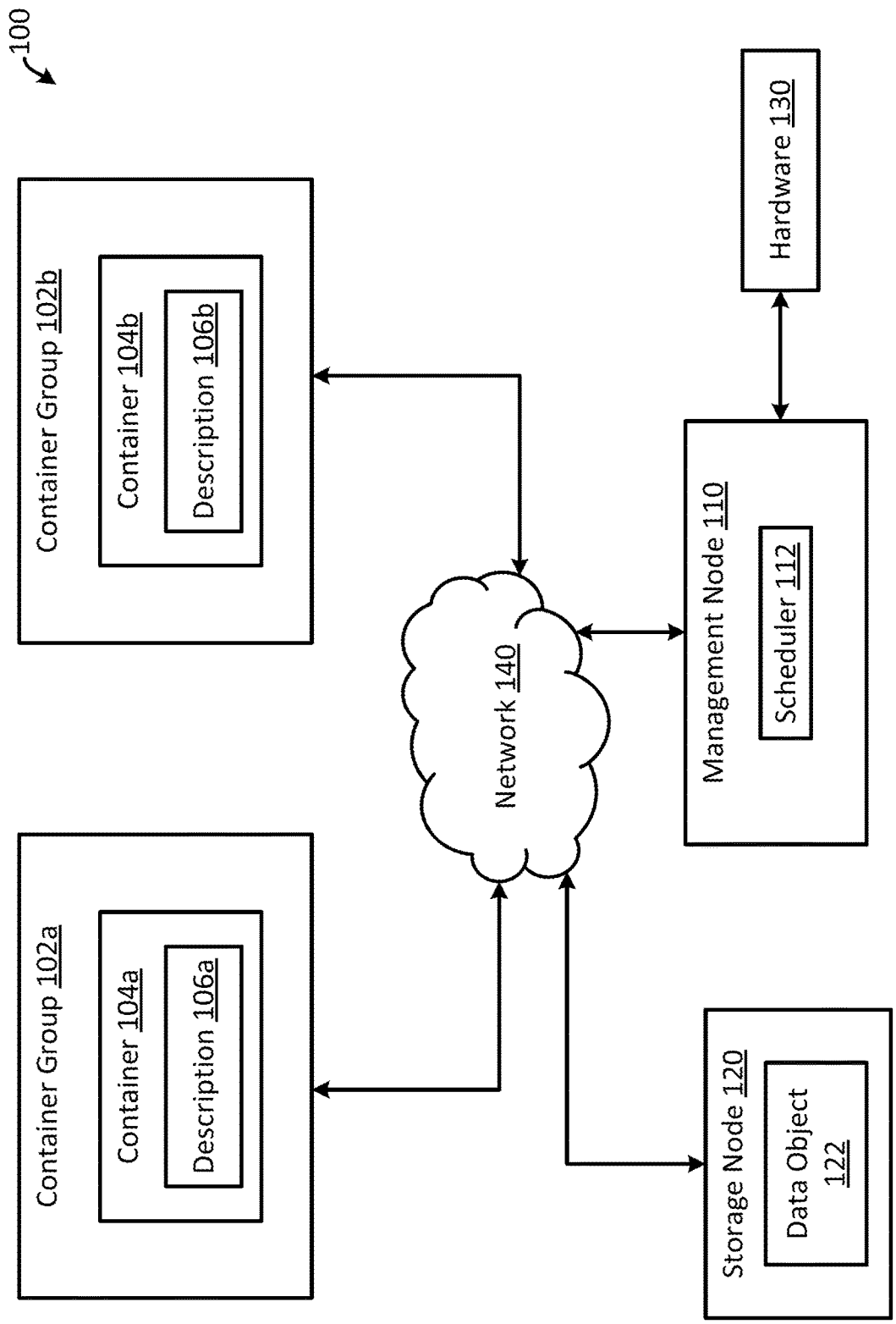
FIG. 1 is a block diagram of an example of a system for implementing container management for cryptanalysis attack protection according to some aspects of the present disclosure.

Containers in a cloud environment can be monitored for cryptanalysis attacks. The cloud environment may continually monitor each container to identify a cryptanalysis attack. Therefore, monitoring containers is often computationally expensive. Additionally, merely monitoring for a cryptanalysis attack may not reduce a likelihood of a cryptanalysis attack occurring.

Some examples of the present disclosure can overcome one or more of the abovementioned problems by providing a system that restricts hardware access to containers that do not need direct access to the hardware. For example, the container can include a description that specifies whether execution operations of the container involve direct access to the hardware. The hardware can include encryption and decryption libraries that may be used by a container in a cryptanalysis attack. Based on the container not needing direct access to the hardware, the system can restrict the container from accessing the hardware. Therefore, the container can be determined to be safe and the system can perform encryption operations and decryption operations for a data object requested by the container without providing the container access to the encrypted data object prior to the decryption operation. As a result, the system may not monitor the container for a cryptanalysis attack, since the container cannot access the hardware or the encrypted data object.

Additionally, the system may determine operations of a second container involve direct access to the hardware. The second container may therefore be determined to be unsafe. The system can then determine whether the second container can execute in the system. For example, the system may permit unsafe containers that satisfy one or more predefined conditions to execute. Examples of the predefined conditions can include geographic restrictions or an entity association of the second container. Subsequent to determining the second container satisfies one or more of the predefined conditions, the system can monitor the second container for a cryptanalysis attack. Alternatively, the system may restrict the second container from performing execution operations based on determining the second container is unsafe. Therefore, the system may only permit safe containers from executing, thereby reducing a likelihood of a cryptanalysis attack. If the system permits unsafe containers to perform execution operations, the system may only monitor the unsafe containers, and not the safe containers, which may reduce resources consumed by the system.

One particular example can involve a scheduler of a system receiving a description indicating operations of a container do not involve direct access to hardware, such as a graphics processing unit (GPU). The scheduler can restrict the container's access to the hardware based on the container not needing access to the hardware. The scheduler can then encrypt data objects written by the container and decrypt data objects read by the container. The scheduler can restrict the container from accessing the encrypted data object before the data object is decrypted. Therefore, the container can be considered safe and the scheduler can reserve resources for monitoring for a cryptanalysis attack. The resources can be used for one or more containers that perform operations involving direct access to the hardware, and thus pose a threat for cryptanalysis attacks. As a result, the system can more efficiently and effectively use monitoring resources. Additionally, the system can reduce a likelihood of experiencing a cryptanalysis attack.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing container management for cryptanalysis attack protection according to some aspects of the present disclosure. The system 100 can be a cloud environment that includes containers 104a-b, a management node 110, and a storage node 120. The containers 104a-b can execute on client devices, such as desktop computers, a laptops, mobile phones, etc. The containers 104a-b, the management node 110, and the storage node 120 can communicate over a network 140, such as a local area network (LAN) or the Internet.

In some examples, the containers 104a-b can include descriptions 106a-b specifying hardware requirements for the containers 104a-b. The descriptions 106a-b can be provided by a user during creation of the containers 104a-b. For example, the container 104a can include the description 106b that specifies a first hardware requirement, and the container 104b can include the description 106b that specifies a second hardware description that may be the same or different from the first hardware requirement. The hardware requirements may include an indication of whether execution operations of the respective container involve direct access to hardware 130. Examples of the hardware 130 can include a streaming single instruction, multiple data (SIMD) extension (SSE), a GPU, or a smart network interface card (NIC). The hardware 130 can include encryption libraries and decryption libraries. A container may be considered safe if the execution operations not involve direct access to the hardware 130 and unsafe if the execution operations do involve direct access to the hardware 130. A container requiring access to the hardware 130 may be considered unsafe because the container may be able attempt a cryptanalysis attack using the hardware 130.

A scheduler 112 of the management node 110 can receive the descriptions 106a-b from the containers 104a-b. For example, the scheduler 112 can receive the description 106a from the container 104a specifying that the container 104a does not need direct access to the hardware 130. Based on the description 106a indicating that the container 104a does not need direct access to the hardware 130, the scheduler 112 can determine the container 104a is a safe container. The scheduler 112 can then assign the container 104a to a container group 102a. Each container in the container group 102a can be a safe container that does not need direct access to the hardware 130. The scheduler 112 can additionally receive the description 106b from the container 104b specifying that the container 104b does need direct to the hardware 130. Based on the description 106b indicating that the container 104b does need direct access to the hardware 130, the scheduler 112 can determine the container 104b is an unsafe container. The scheduler 112 can then assign the container 104b to a container group 102b. Each container in the container group 102b can be an unsafe container that needs direct access to the hardware 130.

In some examples, the scheduler 112 can restrict unsafe containers from executing in the system 100. For example, the scheduler 112 can restrict the container 104b, and other containers of the container group 102b, from performing execution operations based on determining each container of the container group 102b is unsafe. In other examples, the scheduler 112 may limit the unsafe containers that are allowed to execute in the system 100. If the scheduler 112 determines one or more unsafe containers are permitted to execute in the system 100, the scheduler 112 may monitor the one or more containers for a cryptanalysis attack. For example, the scheduler 112 can determine the container 104b is permitted to execute in the system 100, and then the scheduler 112 can monitor the container 104b. Monitoring containers is further described in FIG. 2.

For containers that are determined by the scheduler 112 to be safe, the scheduler 112 can then restrict access to the hardware 130 based on the containers not needing access to the hardware 130. For example, the container 104a can be determined to be safe and the scheduler 112 can restrict access to the hardware 130 for the container 104a. Therefore, the container 104a can be prohibited from accessing the encryption and decryption libraries of the hardware 130. The scheduler 112 can perform encryption and decryption for the container 104a without the container 104a accessing the hardware 130.

As the container 104a performs execution operations, such as read and write operations, the scheduler 112 can perform encryption and decryption for data objects. For example, the container 104a can request to write a data object 122 to the storage node 120. The scheduler 112 can receive the data object 122 and perform an encryption operation using the hardware 130. A result of the encryption operation can be an encrypted version of the data object 122. The scheduler 112 can then store the encrypted version of the data object 122 in the storage node 120. In some examples, the scheduler 112 may use a combined application programming interface (API) to encrypt the data object 122 and write the data object 122. The scheduler 112 can restrict the container 104a from accessing the encrypted version of the data object 122 prior to a decryption operation that decrypts the data object 122.

The container 104a can then request to read the data object 122 from the storage node 120. The scheduler 112 can retrieve the encrypted version of the data object 122 and perform a decryption operation using the hardware 130. The scheduler 112 can then transmit a decrypted version of the data object 122 to the container 104a. In some examples, the scheduler 112 may use a combined API to read the data object 122 and decrypt the data object 122. The scheduler 112 performing the encryption and decryption for the container 104a without the container 104a having access to the hardware 130 can prevent the container 104a from maliciously manipulating data objects.

FIG. 1 is illustrative and non-limiting. Other examples may include more components, fewer components, different components, or a different arrangement of the components shown in FIG. 1. For example, although the system 100 includes two containers in the example of FIG. 1, the system 100 may include a larger number of containers in other examples. Additionally, although the system 100 includes containers that are managed by a scheduler, other examples can include virtual machines that are managed by a hypervisor.

Figure 2:
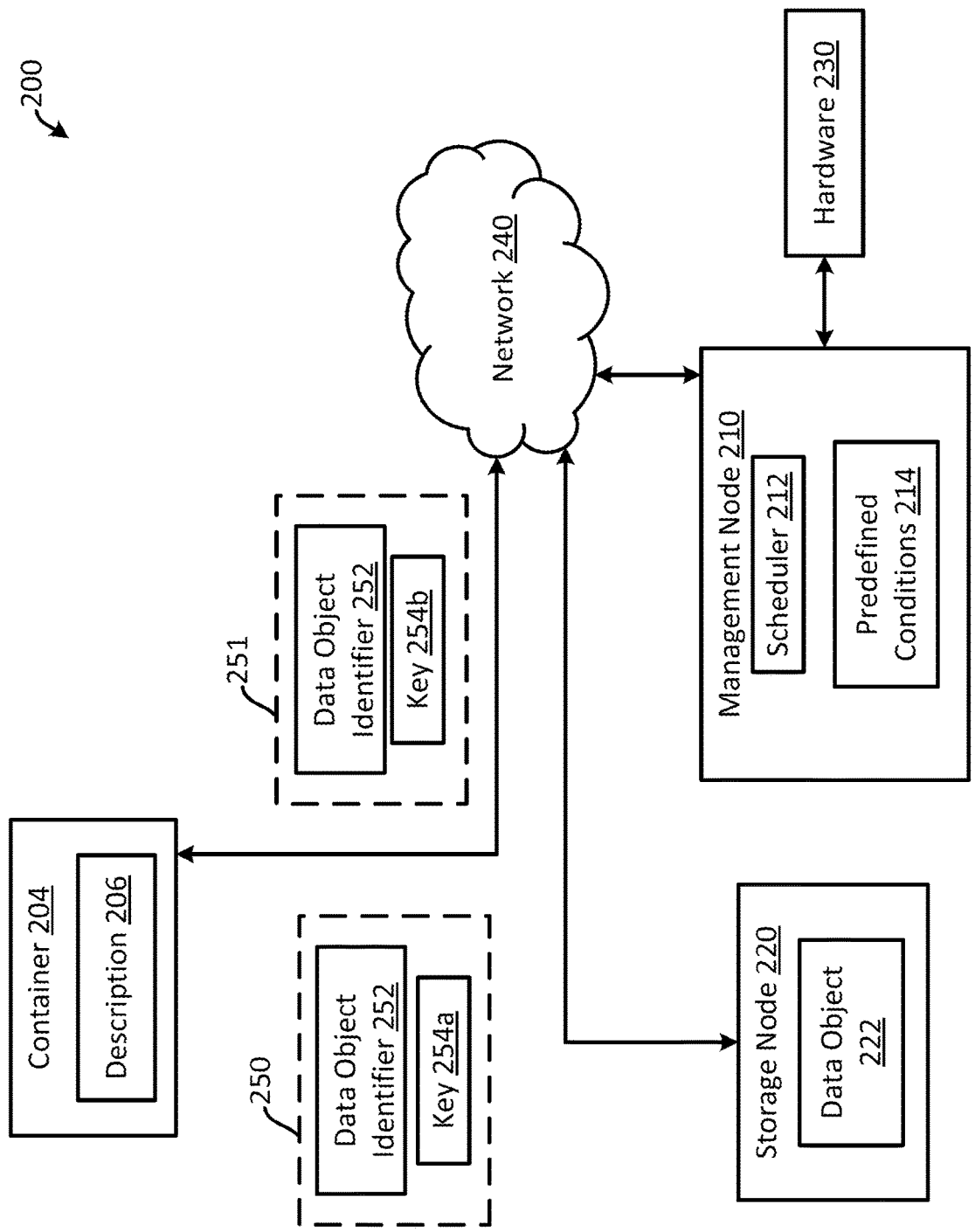
FIG. 2 is a block diagram of an example of a system for implementing container monitoring for a cryptanalysis attack according to some aspects of the present disclosure.

FIG. 2 is a block diagram of a system 200 for implementing container monitoring for a cryptanalysis attack according to some aspects of the present disclosure. The system 200 can include a container 204, a management node 210, and a storage node 220 that communicate over a network 240.

In some examples, a scheduler 212 of the management node 210 can determine, based on a description 206 received from the container 204, that the operations of the container 204 involve hardware 230. For example, the description 206 can indicate that operations of the container 204 involve the GPU. As a result, the scheduler 212 can determine that the container 204 is unsafe.

The management node 210 may include predefined conditions 214 for permitting an unsafe container to execute in the system 200. For example, the predefined conditions 214 can be geographic locations of containers that are able to execute in the system 200, entity associations for containers that can execute in the system 200, or any other suitable condition for restricting containers from executing. As one particular example, the predefined conditions 214 can specify that an unsafe container associated with one or more countries can execute in the system 200. The scheduler 212 can determine the container 204 is associated with a country of the one or more countries specified in the predefined conditions 214 and then allow the container 204 to execute in the system 200. The scheduler 212 may assign the container 204 to a container group that includes unsafe containers, such as the container group 102b in FIG. 1.

After determining the container 204 can execute in the system 200, the scheduler 212 can monitor the container 204 for a cryptanalysis attack. The monitoring can involve the scheduler 212 recognizing encryption and decryption patterns by the container 204. For example, the scheduler 212 may identify a cryptanalysis attack by determining the container 204 makes a number of unsuccessful attempts to access a data object 222 that is encrypted and stored in the storage node 220. The scheduler 212 may receive a first attempt 250 from the container 204 to access the data object 222. The first attempt 250 can include a data object identifier 252 for the data object 222 and a key 254a for decrypting the data object 222. A decryption library of the hardware 230 can include a particular key for decrypting the data object 222. The scheduler 212 can determine the first attempt 250 is unsuccessful because the key 254a is not the particular key that is usable by the decryption library to decrypt the data object 222.

The scheduler 212 can then receive a second attempt 251 from the container 204 to access the data object 222. The second attempt 251 can include the data object identifier 252 for the data object 222 and a key 254b that is different from the key 254a. The scheduler 212 can determine the key 254b is not the particular key for decrypting the data object 222, and thus that the second attempt 251 is also unsuccessful. After a predefined number of unsuccessful attempts, such as two unsuccessful attempts, made by the container 204 to access the data object 222, the scheduler 212 can identify the container 204 as performing a cryptanalysis attack. In response, the scheduler 212 may freeze the container 204 and prevent the container 204 from performing further operations.

FIG. 2 is illustrative and non-limiting. Other examples may include more components, fewer components, different components, or a different arrangement of the components shown in FIG. 2. For example, although the system 200 includes one container in the example of FIG. 2, the system 200 may include a larger number of containers in other examples. Additionally, although the system 200 includes a container that is managed by a scheduler, other examples can include a virtual machine that is managed by a hypervisor.

Figure 3:
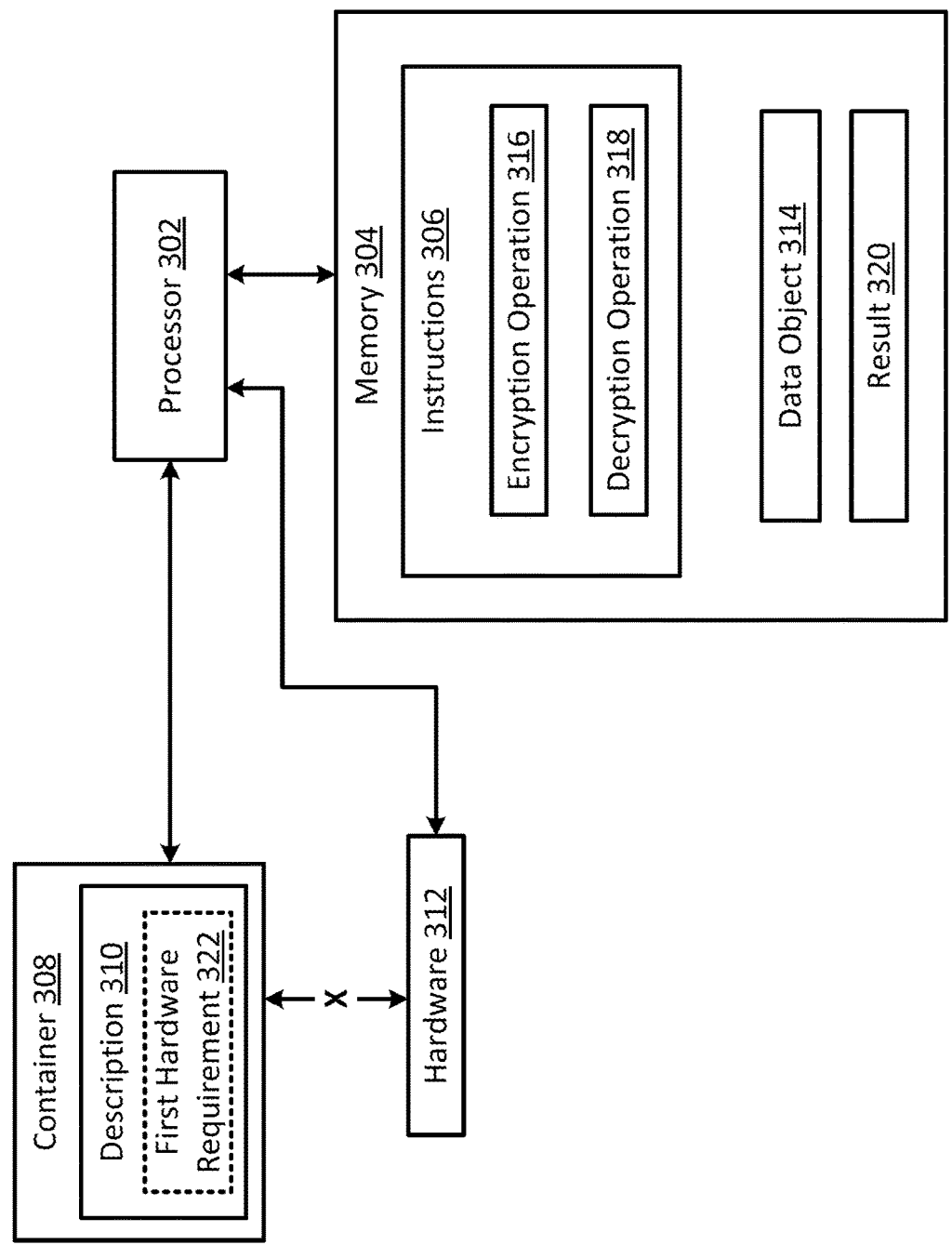
FIG. 3 is a block diagram of another example of a system for implementing container management for cryptanalysis attack protection according to some aspects of the present disclosure.

FIG. 3 is a block diagram of another example of a system 300 for implementing container management for cryptanalysis attack protection according to some aspects of the present disclosure. The system 300 includes a processor 302. The processor 302 may be part of a management node, such as the management node 110 in FIG. 1.

In this example, the processor 302 is communicatively coupled with a memory 304. The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. The instructions 306 can include processor-specific instructions generated by a compiler or an interpreter from code written in any suitable computer-programming language, such as C, C++, C#, etc.

The memory 304 can include one memory or multiple memories. Non-limiting examples of the memory 304 can include electrically erasable and programmable read-only memory (EEPROM), flash memory, or any other type of non-volatile memory. At least some of the memory 304 includes a non-transitory computer-readable medium from which the processor 302 can read the instructions 306. The non-transitory computer-readable medium can include electronic, optical, magnetic, or other storage devices capable of providing the processor 302 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 306.

In some examples, the processor 302 can execute the instructions 306 to perform operations. For example, the processor 302 can receive, from a container 308, a description 310 specifying a first hardware requirement 322 for the container 308. For example, the first hardware requirement 322 can be that execution operations of the container 308 do not involve direct access to hardware 312. The processor 302 may determine the container 308 is safe based on the first hardware requirement 322 and assign the container 308 to a safe container group. The processor 302 can restrict access to hardware 312 based on the first hardware requirement 322 for the container 308. The processor 302 can perform, for a data object 314 requested by the container 308, an encryption operation 316 and a decryption operation 318 using the hardware 312. A result 320 of the encryption operation 316 can be inaccessible to the container 308 prior to the decryption operation 318.

Figure 4:
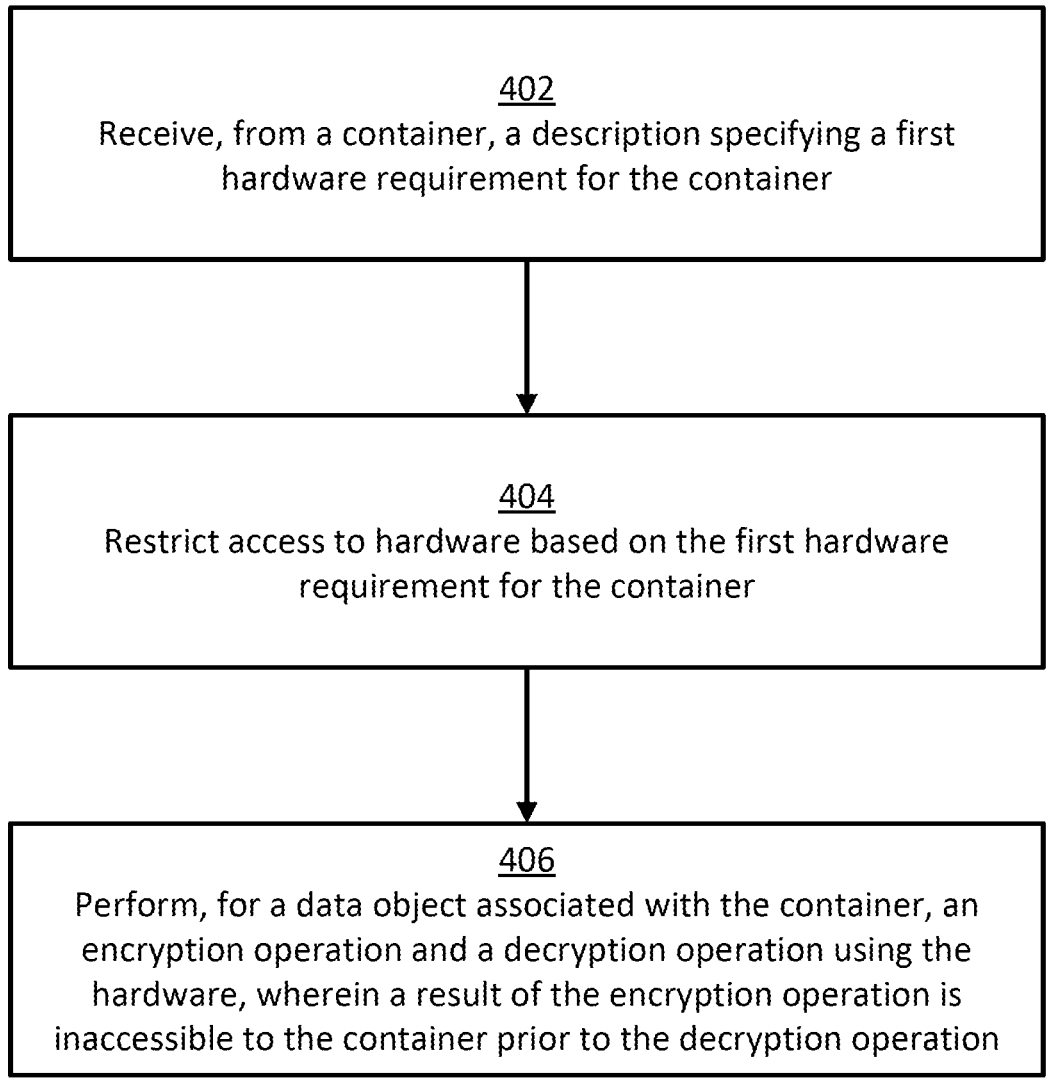
FIG. 4 is a flow chart of a process for container management for cryptanalysis attack protection according to some aspects of the present disclosure.

The processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, the processor 202 can receive, from a container 308, a description 310 specifying a first hardware requirement 322 for the container 308. The first hardware requirement 322 can involve execution operations of the container 308 not involving direct access to hardware 312. Examples of the hardware 312 can include a GPU, smart NIC, etc.

In block 404, the processor 302 can restrict access to hardware 312 based on the first hardware requirement 322 for the container 308. Therefore, the hardware 312 can be inaccessible to the container 308. As a result, the processor 302 may not monitor the container 308 for a cryptanalysis attack. Other containers that perform operations that involve direct access to the hardware 312 may be monitored by the processor 302 for a cryptanalysis attack.

In block 406, the processor 302 can perform, for a data object 314 requested by the container 308, an encryption operation 316 and a decryption operation 318 using the hardware 312. A result 320 of the encryption operation 316 can be inaccessible to the container 308 prior to the decryption operation 318. Since the container 308 can be restricted from accessing the hardware 312, the threat of the container 308 performing a cryptanalysis attack may be reduced or eliminated. Thus, resources for monitoring for a cryptanalysis attack can be used more efficiently and effectively.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
   a processor; and
   a memory including instructions that are executable by the processor for causing the processor to:
   receive, from a container, a description specifying a first hardware requirement for the container;
   restrict access to hardware based on the first hardware requirement for the container; and perform, for a data object requested by the container, an encryption operation and a decryption operation using the hardware, wherein a result of the encryption operation is inaccessible to the container prior to the decryption operation.

2. The system of claim 1, wherein the memory further includes instructions that are executable by the processor for causing the processor to:
  determine the container is safe based on the description specifying the first hardware requirement for the container; and
  in response to determining the container is safe, assign the container to a first container group, wherein each container of the first container group is safe.

3. The system of claim 1, wherein the container is a first container and the description is a first description and the memory further includes instructions that are executable by the processor for causing the processor to:
  receive, from a second container, a second description specifying a second hardware requirement for the second container; and
  determine the second container is unsafe based on the second description specifying the second hardware requirement.

4. The system of claim 3, wherein the memory further includes instructions that are executable by the processor for causing the processor to:
  assign the second container to a second container group, wherein each container of the second container group is unsafe; and
  monitor the second container for a cryptanalysis attack by the second container.

5. The system of claim 4, wherein the memory includes instructions that are executable by the processor for causing the processor to identify the cryptanalysis attack by determining a number of unsuccessful attempts made by the second container to access a data object exceeds a predefined number of unsuccessful attempts.

6. The system of claim 4, the memory further includes instructions that are executable by the processor for causing the processor to:
  determine the second container satisfies one or more predefined conditions; and
  in response to determining the second container satisfies the one or more predefined conditions, assign the second container to the second container group.

7. The system of claim 6, wherein the one or more predefined conditions comprise a geographic location associated with the second container.

8. The system of claim 3, wherein the memory further includes instructions that are executable by the processor for causing the processor to, in response to determining the second container is unsafe, restrict the second container from performing execution operations.

9. A computer-implemented method comprising:
  receiving, from a container, a description specifying a first hardware requirement for the container;
  restricting access to hardware based on the first hardware requirement for the container; and
  performing, for a data object requested by the container, an encryption operation and a decryption operation using the hardware, wherein a result of the encryption operation is inaccessible to the container prior to the decryption operation.

10. The method of claim 9, further comprising:
  determining the container is safe based on the description specifying the first hardware requirement for the container; and
  in response to determining the container is safe, assigning the container to a first container group, wherein each container of the first container group is safe.

11. The method of claim 9, wherein the container is a first container and the description is a first description and the method further comprises:
  receiving, from a second container, a second description specifying a second hardware requirement for the second container; and
  determining the second container is unsafe based on the second description specifying the second hardware requirement.

12. The method of claim 11, further comprising:
  assigning the second container to a second container group, wherein each container of the second container group is unsafe; and
  monitoring the second container for a cryptanalysis attack by the second container.

13. The method of claim 12, further comprising identifying the cryptanalysis attack by determining a number of unsuccessful attempts made by the second container to access a data object exceeds a predefined number of unsuccessful attempts.

14. The method of claim 12, further comprising:
  determining the second container satisfies one or more predefined conditions; and
  in response to determining the second container satisfies the one or more predefined conditions, assigning the second container to the second container group.

15. The method of claim 14, wherein the one or more predefined conditions comprise a geographic location associated with the second container.

16. The method of claim 11, wherein the further comprising, in response to determining the second container is unsafe, restricting the second container from performing execution operations.

17. A non-transitory computer-readable medium comprising program code that is executable by a processor for causing the processor to:
  receive, from a container, a description specifying a first hardware requirement for the container;
  restrict access to hardware based on the first hardware requirement for the container; and
  perform, for a data object requested by the container, an encryption operation and a decryption operation using the hardware, wherein a result of the encryption operation is inaccessible to the container prior to the decryption operation.

18. The non-transitory computer-readable medium of claim 17, further comprising program code that is executable by a processor for causing the processor to:
  determine the container is safe based on the description specifying the first hardware requirement for the container; and
  in response to determining the container is safe, assign the container to a first container group, wherein each container of the first container group is safe.

19. The non-transitory computer-readable medium of claim 17, wherein the container is a first container and the description is a first description further comprising program code that is executable by a processor for causing the processor to:

receive, from a second container, a second description specifying a second hardware requirement for the second container; and determine the second container is unsafe based on the second description specifying the second hardware requirement.

20. The non-transitory computer-readable medium of claim 19, further comprising program code that is executable by a processor for causing the processor to:

assign the second container to a second container group, wherein each container of the second container group is unsafe; and monitor the second container for a cryptanalysis attack by the second container.

\* \* \* \* \*